United States Patent [19]

Zimmerman et al.

[11] Patent Number: 5,555,109
[45] Date of Patent: *Sep. 10, 1996

[54] ILLUMINATION SYSTEM EMPLOYING AN ARRAY OF MICROPRISMS

[75] Inventors: Scott M. Zimmerman, Basking Ridge; Karl W. Beeson, Princeton; Janpu Hou, Bridgewater; John C. Schweyen, Midland Park, all of N.J.

[73] Assignee: AlliedSignal Inc., Morris Township, N.J.

[*] Notice: The term of this patent shall not extend beyond the expiration date of Pat. No. 5,396,350.

[21] Appl. No.: 394,098

[22] Filed: Feb. 24, 1995

Related U.S. Application Data

[63] Continuation of Ser. No. 242,525, May 13, 1994, which is a continuation-in-part of Ser. No. 149,219, Nov. 5, 1993, Pat. No. 5,396,350.

[51] Int. Cl.[6] ............................................. G02F 1/1335
[52] U.S. Cl. ........................ 359/40; 359/42; 359/48; 359/49; 359/69
[58] Field of Search ........................ 359/42, 48, 49, 359/69; 362/26, 27, 39

[56] References Cited

U.S. PATENT DOCUMENTS

| 5,040,878 | 8/1991 | Eichenlaub | 350/345 |
|---|---|---|---|
| 5,126,882 | 6/1992 | Oe et al. | 359/619 |
| 5,151,801 | 9/1992 | Hiroshima | 359/40 |
| 5,206,746 | 4/1993 | Ooi et al. | 359/40 |
| 5,329,386 | 7/1994 | Birecki et al. | 359/42 |
| 5,396,350 | 3/1995 | Beeson et al. | 359/48 |

FOREIGN PATENT DOCUMENTS

| 2736486 | 2/1978 | Germany | G03B 21/11 |
|---|---|---|---|

OTHER PUBLICATIONS

IBM Technical Disclosure Bulletin, vol. 33, No. 9, Feb. 1991; High Efficiency Back Light For LCD.

*Primary Examiner*—Wael M. Fahmy
*Assistant Examiner*—Fetsum Abraham
*Attorney, Agent, or Firm*—Verne E. Kreger, Jr.

[57] ABSTRACT

An optical illumination system comprising a waveguide that accepts light generated by a diffuse light source and transmits the light via total internal reflection. Attached on one face of the waveguide is an array of microprisms, with each microprism having an light input surface parallel to a light output surface and at least two sidewalls tilted at an angle from the direction normal to the surface of the waveguide such that light escapes from the waveguide, reflects off the tilted sidewalls and emerges from the microprism as a spatially directed light source. An array of microlenses may be positioned to accept the output of the microprisms so that the light exiting from the microlenses is a substantially collimated light source. The optical illumination system is advantageous for any application that requires a non diffuse or substantially collimated that is both energy efficient and contained in a low profile assembly.

20 Claims, 6 Drawing Sheets

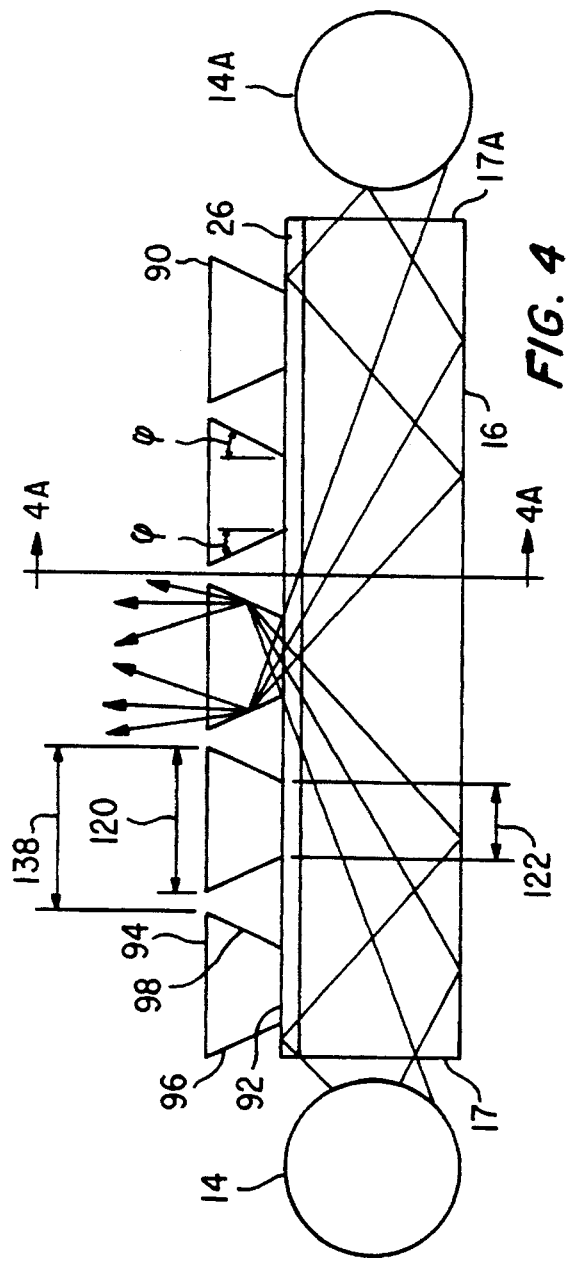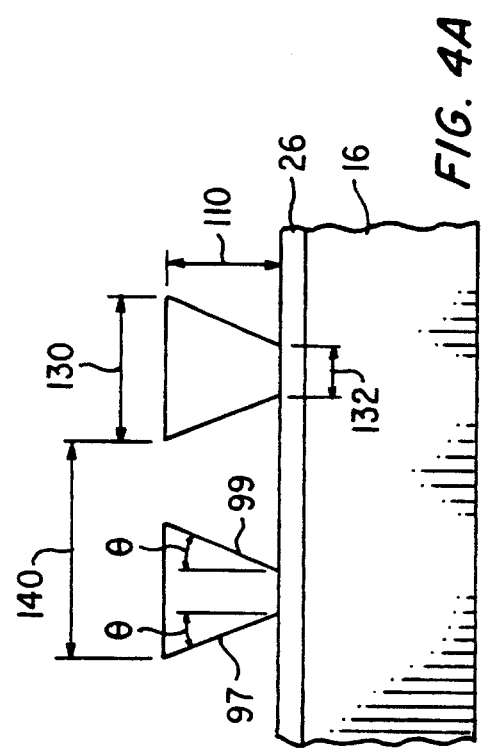

ILLUMINATION SYSTEM EMPLOYING AN ARRAY OF MICROPRISMS

CROSS REFERENCE TO RELATED APPLICATION

This application is a continuation of allowed application Ser. No. 08/242,525 filed on May 13,1994 which is a continuation-in-part of application Ser. No. 08/149,219, Nov. 5, 1993, U.S. Pat. No. 5,396,350.

BACKGROUND OF THE INVENTION

This invention relates generally to an optical illumination system for collimating light that provides for relatively high light transmission. More particularly, the invention is directed to an illumination system having a plurality of optical microprisms and microlenses for redirecting light removed from a non-collimated light source and providing either separately or in combination a non diffuse or a substantially collimated light source output.

A number of optical and illumination applications require the production of either a non diffuse or a collimated light source which provides an efficient output of light. Typical problems encountered with collimated light sources include: 1) a non-uniform light distribution; 2) a lack of a controlled directional output of light; 3) inefficiencies with regard to the amount of the collimated light output versus the amount of the non-collimated light input; and 4) the lack of an efficient collimated light source in a compact design or narrow profile.

Accordingly, there exists a need in the optical and illumination arts to provide an illumination assembly that provides an energy efficient light source while maintaining a narrow profile.

SUMMARY OF THE INVENTION

The present invention is directed to an optical illumination system which provides either separately or in combination a non diffuse or a substantially collimated light source that is energy efficient (hereinafter referred to as a spatially directed light source). Additionally, this invention is directed to any lighting application that requires a low profile spatially directed light source.

The optical illumination system comprises a diffuse input light source in close proximity to a light transmitting means, a reflecting means for removing and redirecting the light from the light transmitting means where the reflecting means are operatively disposed adjoining said light transmitting means. The reflecting means comprises an array of microprisms, or in combination an array of microprisms in optical cooperation with an array of microlenses whereby the microprisms are operatively disposed between the light transmitting means and the microlenses. The reflecting means of the present invention provide an energy efficient distribution of spatially directed light that is provided in a low profile assembly.

In one preferred embodiment, a single input light source is positioned adjacent to a light accepting surface of the light transmitting means. The light transmitting means may be any structure that transmits light via reflection, such as a light pipe, light wedge, waveguide or any other structure known to those skilled in the art. Preferably the light transmitting means comprises a waveguide that accepts the light generated by the input light source and transports the light via total internal reflection (TIR). Attached on one face of the waveguide is an array of microprisms. The microprisms comprise a light input surface in contact with the waveguide and a light output surface distal to and parallel with the light input surface. The microprisms further comprise four sidewalls. The four sidewalls are angled in such a way that light traveling through the waveguide is captured and redirected by the microprisms, reflects through the microprisms via TIR and emerges from the microprisms as a spatially directed light source. A spatially directed light source is meant to include a substantially collimated light source in a direction substantially perpendicular to the to the light output surface or a light source directed at an angle with respect to the normal of the light output surface.

In an alternate embodiment, an array of microlenses is operatively disposed adjacent to the light output surface of the microprisms. The four sidewalls of each microprism are angled in such a way that light from the single light source traveling through the waveguide is captured by the microprisms, reflects through the microprisms via TIR and emerges from the microprisms as a spatially directed light source. The microlenses are formed with the proper curvature and positioned so that the light emanating from each microprism is directed to a corresponding microlens. The light transmits through the microlenses and emerges as a substantially collimated light source.

In another preferred embodiment two input light sources are positioned adjacent to oppositely disposed light accepting surfaces of the light transmitting means. The light transmitting means comprises a waveguide that accepts the light generated by both input light sources and transports the light via TIR. Attached on one face of the waveguide is an array of microprisms. The microprisms comprise a light input surface in contact with the waveguide and a light output surface distal to and parallel with the light input surface. The microprisms further comprise four tilted sidewalls that are angled in such a way that light traveling in the waveguide from both input light sources is captured and redirected by the microprisms, reflects through the microprisms via TIR and emerges from the microprisms as a spatially directed light source.

In still another alternate embodiment, an array of microlenses is operatively disposed adjacent to the light output surface of the microprisms. The four sidewalls of each microprism are angled in such a way that light from both light sources traveling through the waveguide is captured by the microprisms, reflects through the microprisms via TIR and emerges from the microprisms as a spatially directed light source. The microlenses are formed with the proper curvature and positioned so that the light emanating from each microprism is directed to a corresponding microlens or a plurality of microlenses. The light transmits through the microlenses and emerges as a substantially collimated light source.

There are many illumination applications that can take advantage of such an illumination system employing such an arrangement of microprisms and microlenses. Such applications exist in the automotive industry, the aerospace industry and the commercial and residential markets. Some automotive applications, by way of example only and are not intended to limit the possible applications include: low profile car headlights and taillights; low profile interior car lights such as reading lights and map lights; light sources for dashboard displays; backlights for flat panel navigation displays, flat panel auto TV screens and flat panel electronic instrument displays; traffic lights; and backlights for road signs. Illustrative examples in the aerospace industry include backlights for flat panel cockpit displays and flat panel TV screens in the passenger section of the aircraft; low profile reading lights and aircraft landing lights; and runway landing lights. Residential and commercial applications include low profile interior and exterior spotlights and room lighting with a low degree of collimation; backlights for flat panel TV screens, LCD displays, such as computers, game displays, appliance displays, machine displays and picture phones.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which:

FIG. 4 is an elevation view of an alternate embodiment of the present invention in conjunction with two input light sources;

FIG. 4A is an exploded view of the embodiment of FIG. 4;

DETAILED DESCRIPTION OF THE PREFERRED EMBODIMENTS

The preferred embodiments of the present invention will be better understood by those skilled in the art by reference to the above figures. The preferred embodiments of this invention illustrated in the figures are not intended to be exhaustive or to limit the invention to the precise form disclosed. They are chosen to describe or to best explain the principles of the invention and its applicable and practical use to thereby enable others skilled in the art to best utilize the invention.

Figure 1:
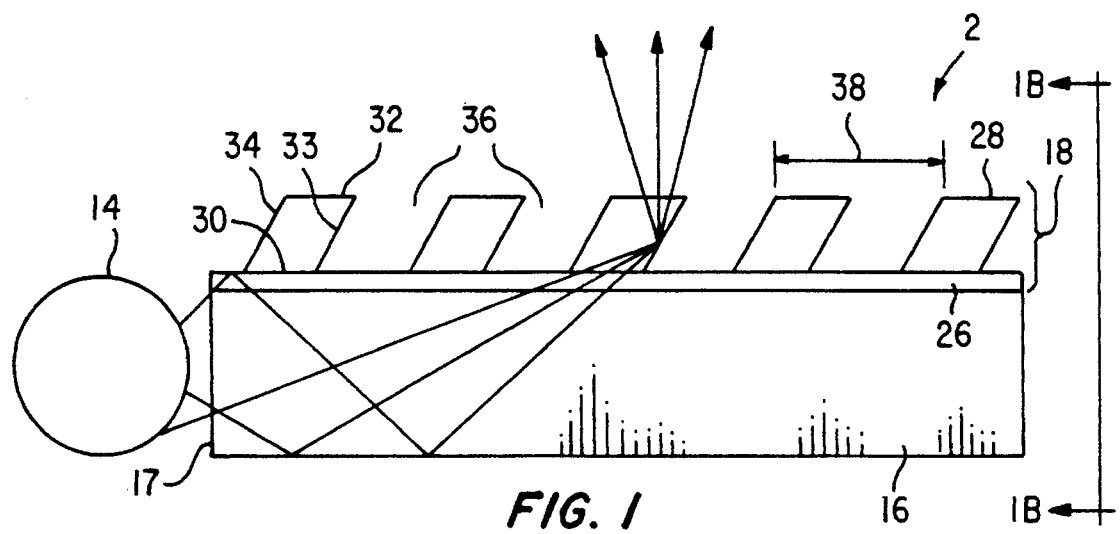
FIG. 1 is an elevation view of one embodiment of the present invention in conjunction with a single input light source.
Figure 1A:
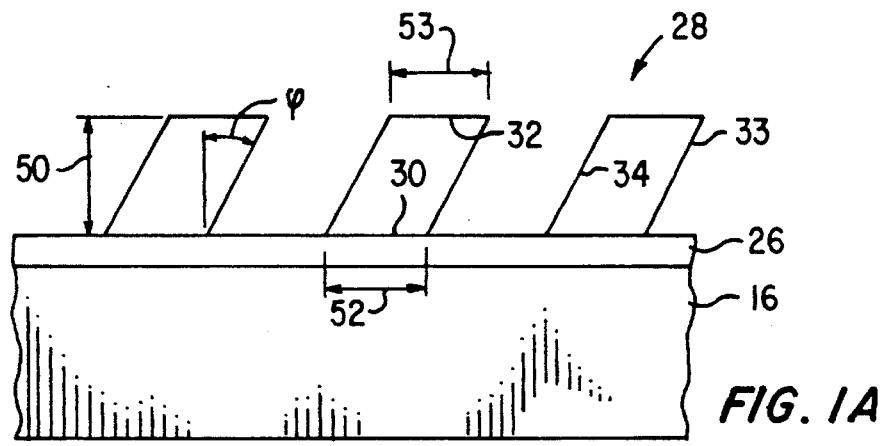
FIG. 1A is an exploded view of the embodiment of FIG. 1.
Figure 1B:
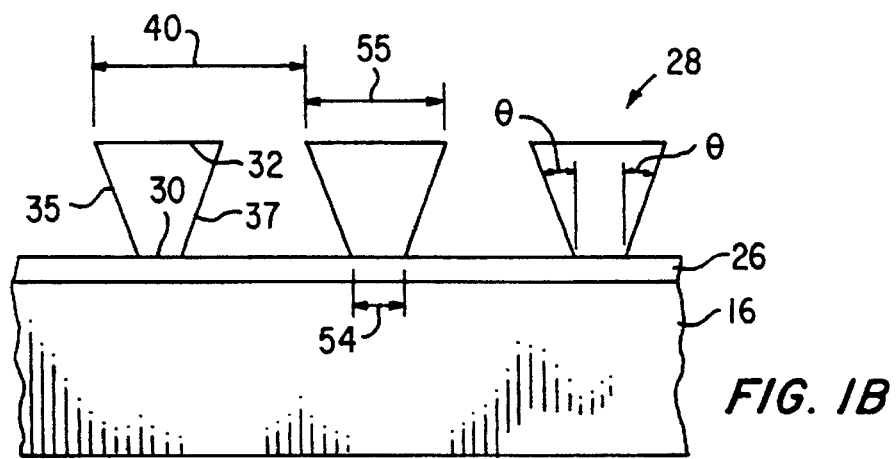
FIG. 1B is an alternate view of the embodiment of FIG. 1.

One preferred embodiment of the present invention is shown in FIGS. 1, 1A and 1B. An illumination system, represented by the number 2, comprises a light generating means 14, a waveguide 16 having a light accepting surface 17 and a transparent reflecting means 18 in contact with waveguide 16. Illustrative of useful light generating means 14 are lasers, fluorescent tubes, light emitting diodes, incandescent lights, sunlight and the like. The waveguide 16 is made from any transparent material such as glass or polymer. In FIG. 1, light generating means 14 is in close proximity to waveguide 16, and reflecting means 18 is in contact with wave guide 16.

The reflecting means 18 comprises an optional adhesion promoting layer 26 and an array of microprisms 28. Light reflects through waveguide 16 via TIR and enters each microprism 28 by way of light input surface 30, reflects off sidewalls 33, 35 and 37 and exits the microprism 28 through the light output surface 32 as a spatially directed light source.

Waveguide 16 is transparent to light within the wavelength range from about 400 to about 700 nm. The index of refraction of the waveguide 16 may range from about 1.40 to about 1.65. The most preferred index of refraction is from about 1.45 to about 1.60. The waveguide 16 may be made from any transparent solid material. Preferred materials include transparent polymers, glass and fused silica. Desired characteristics of these materials include mechanical and optical stability at typical operation temperatures of the device. Most preferred materials are glass, acrylic, polycarbonate and polyester.

Microprisms 28 can be constructed from any transparent solid material. Preferred materials have an index of refraction equal to or greater than waveguide 16. Preferred materials have a refractive index between about 1.40 and about 1.65 and include polymethylmethacrylate, polycarbonate, polyester, poly(4-methyl pentene), polystryrene and polymers formed by photopolymerization of acrylate monomers. More preferred materials have an index of refraction between abut 1.45 and about 1.60 and may include polymers formed by photopolymerization of acrylate monomer mixtures composed of urethane acrylates and methacrylates, ester acrylates and methacrylates, epoxy acrylates and methacrylates, (poly) ethylene glycol acrylates and methacrylates and vinyl containing organic monomers. Useful monomers include methyl methacrylate, n-butyl acrylate, 2-ethylhexyl acrylate, isodecyl acrylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, trimethylolpropane triacrylate, pentaerythritol triacrylate and pentaerythritol tetra-acrylate. Especially useful are mixtures wherein at least one monomer is a multifunctional monomer such as diacrylate or triacrylate, as these will produce a network of crosslinks within the reacted photopolymer. The most preferred materials for microprisms 28 formed by photolithography are crosslinked polymers formed by photopolymerizing mixtures of ethoxylated bisphenol A diacrylate and trimethylolpropane triacrylate. The index of refraction of the most preferred materials ranges from about 1.53 to about 1.56. Other materials that can be used in alternate methods of manufacture, such as injection molding, include polycarbonate, acrylic and poly(4-methyl pentene).

Microprisms 28 are separated by interstitial regions 36. The index of refraction of interstitial regions 36 must be less than the index of refraction of the microprism 28. Preferred materials for interstitial regions include air, with an index of refraction of 1.00 and fluoropolymer materials with an index of refraction ranging from about 1.16 to about 1.40. The most preferred material is air.

The optional adhesion promoting layer 26 is an organic material that is light transmissive and that causes the microprisms 28, especially microprisms formed from polymers, as for example photocrosslinked acrylate monomer materials, to adhere strongly to the waveguide 16. Such materials are well known to those skilled in the art. The thickness of adhesion promoting layer 26 is not critical and can vary widely. In the preferred embodiment of the invention, adhesion layer 26 is less than about 30 micrometers thick.

The microprisms may be arranged in any pattern on waveguide 16, such as in a square, rectangular or hexagonal pattern. The microprisms have a repeat distance 38 (FIG. 1) in the direction perpendicular to light accepting surface 17 and repeat distance 40 (FIG. 1B) in the direction parallel to light accepting surface 17. Repeat distances 38 and 40 may be equal or unequal and may vary widely depending on the resolution and dimensions of the display. In addition, the repeat distances 38 and 40 may vary across the surface of the waveguide 16 in order to compensate for a lowering of the light intensity inside waveguide 16 as the distance from light generating means 14 increases. This lowering of the light intensity is due to light removal by the other microprisms of the array.

The microprisms 28 are constructed to form a six-sided geometrical shape having a light input surface 30 parallel with a light output surface 32, wherein the light output surface 32 is equal to or larger in surface area than the light input surface 30. Microprism 28 further comprises two pairs of oppositely disposed sidewalls 33, 34 and 35, 37. Sidewalls 33, 35 and 37 are effective in reflecting and redirecting the light which is propagating through waveguide 16. Preferably, the intersection of sidewall 33 with waveguide 16, or adhesion layer 26 thereon, forms a line that is perpendicular to the average direction of the light. For example, as shown in FIG. 1, the intersection of sidewall 33 with adhesion layer 26 forms a line parallel to the light accepting surface 17 and is therefore perpendicular to the average direction of the light traveling through the waveguide 16. Although sidewall 34 is shown as parallel to sidewall 33, the orientation of side 34 is not critical.

As shown in FIG. 1A, each microprism 28 is formed so that sidewall 33 forms a tilt angle φ to the normal of the surface of waveguide 16. The desired values of tilt angle φ range from about 15 degrees to about 50 degrees. More preferred values for tilt angle φ range from about 20 degrees to about 40 degrees. As will be obvious to those skilled in the art, tilt angle φ determines at which angle with respect to the normal of the light output surface the spatially directed light will emerge.

Referring to FIG. 1B, sidewalls 35 and 37 also form a tilt angle θ to the normal of the surface of waveguide 16. The desired values of tilt angle θ range from about 0 degrees to about 25 degrees. More preferred values for tilt angle θ range from about 2 degrees to about 15 degrees. Perferably, the tilt angles θ associated with sidewalls 35 and 37 are equal, but equal angles are not necessary.

The height of microprism 28 has dimension 50 as shown in FIG. 1A. Height 50 may vary widely depending on the dimensions and resolution of the display. That is, smaller displays, such as laptop computer displays and avionics displays would have greatly reduced dimensions versus larger displays such as large screen, flat-panel televisions.

The length of microprism 28 has dimensions 52 and 53. Length 52 corresponds to the light input surface 30 and length 53 corresponds to the light output surface 32. Length 53 can be equal to or greater than length 52. Lengths 52 and 53 may vary widely depending on the dimensions and resolution of the display. In addition, the length 52 may vary across the surface of the light transmitting means 16 in order to compensate for a lowering of the light intensity inside waveguide 16 as the distance from light generating means 14 increases. That is, microprisms 28 that are closer to light generating means 14 may have a smaller dimension 52 as compared to microprisms farther from light generating means 14. This lowering of the light intensity is due to light removal by the other microprisms of the array. The maximum value for lengths 52 and 53 is less than the repeat distance 38 of FIG. 1.

Microprism 28 has width dimensions 54 and 55 (FIG. 1B), where width 54 corresponds to the light input surface 30 and width 55 corresponds to the light output surface 32. Widths 54 and 55 may vary widely depending on the dimensions and resolution of the display and are a function of tilt angle θ and height 50. In addition, the width 54 may vary across the surface of the light transmitting means 16 in order to compensate for a lowering of the light intensity inside waveguide 16 as the distance from light generating means 14 increases. The maximum value for widths 54 and 55 is less than the repeat distance 40. It is desireable that length dimension 52 be larger than width dimension 54. It is preferred that the ratio of length 52 to width 54 be in the range of 1.2:1 to 5:1. It is more preferred that the ratio be in the range of 1.5:1 to 3:1.

Figure 2:
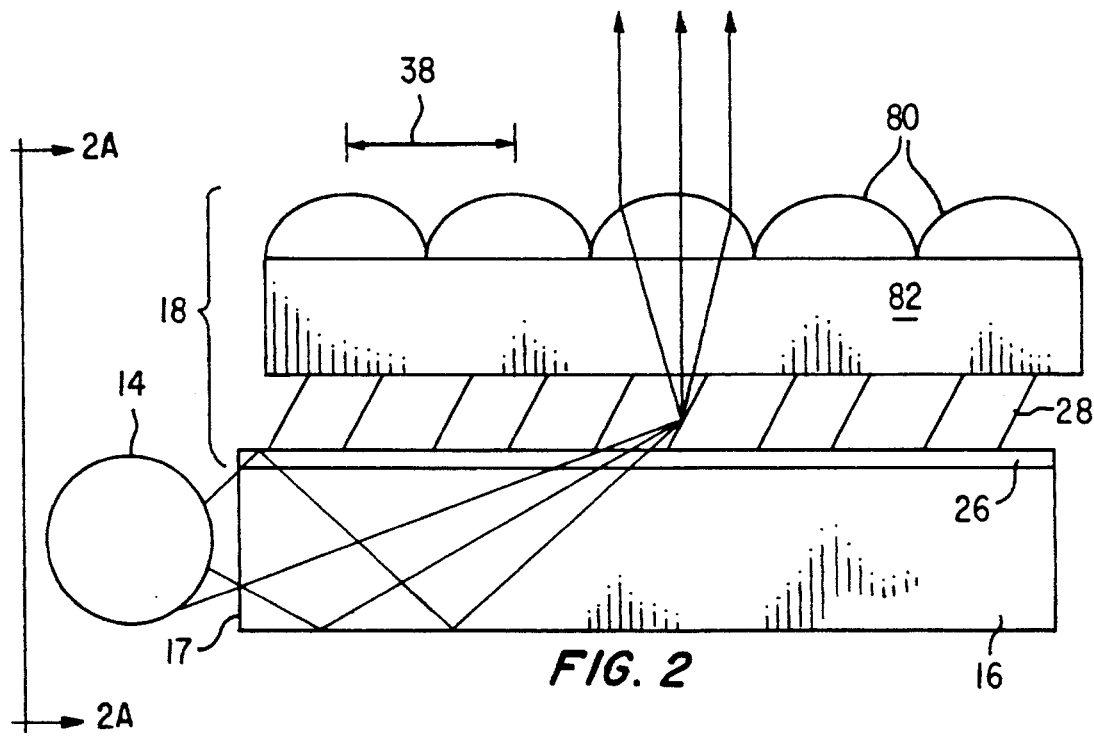
FIG. 2 is an elevation view of the embodiment of FIG. 1 including an array of microlenses.
Figure 2A:
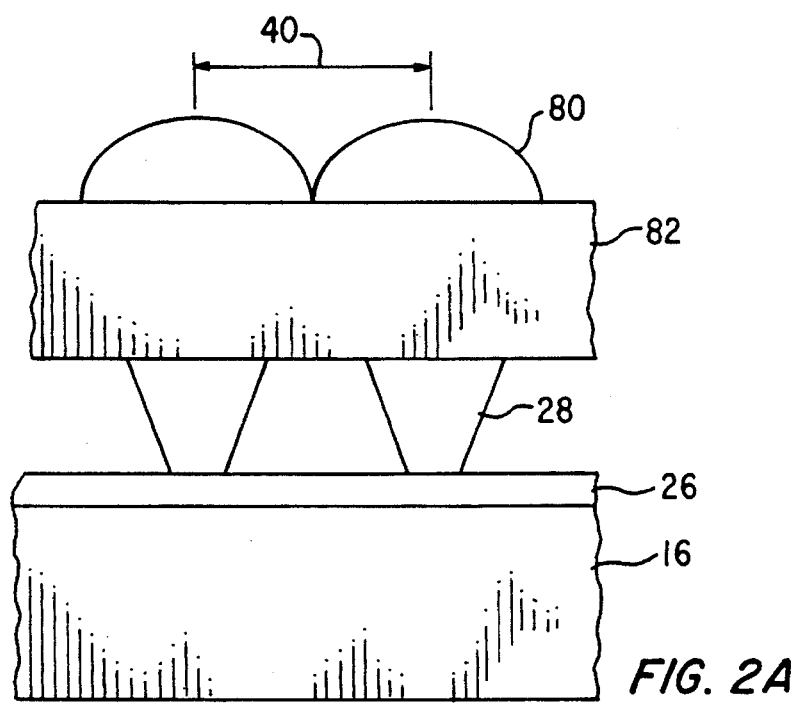
FIG. 2A is an alternate view of the embodiment of FIG. 2; corresponding microlens.

In an alternate embodiment, reflecting means 18 further comprises an array of microlenses 80 as shown in FIGS. 2 and 2A. The microlenses 80 are disposed in close proximity to the microprisms 28. If the microlenses 80 are fabricated by photopolymerization, they are preferably made from the same monomers as those previously disclosed for the microprisms 28 and have a index of refraction equal to or substantially equal to the index of refraction of the microprisms 28. However, any transparent material may be used, as for example, those materials previously discussed. The center-to-center distance between microlenses directly correlates to the repeat distances 38 and 40 of the microprisms 28. That is, for every microprism 28 there exists a corresponding microlens 80 that aligns with the output surface 32 of each microprism 28.

A spacer 82 separates the microlenses 80 and the microprisms 28. The thickness of spacer 82 is optimized to cause light from microprisms 28 to be collimated by microlenses 80. Spacer 82 may be made from any transparent material. Preferred materials include transparent polymers, glass and fused silica. Preferably spacer 82 has an index of refraction equal to or substantially equal to the index of refraction of the microprisms 28 and the microlenses 80. Desired characteristics of these materials include mechanical and optical stability at typical operation temperatures of the device. Most preferred materials are glass, acrylic, polycarbonate and polyester.

Figure 3:
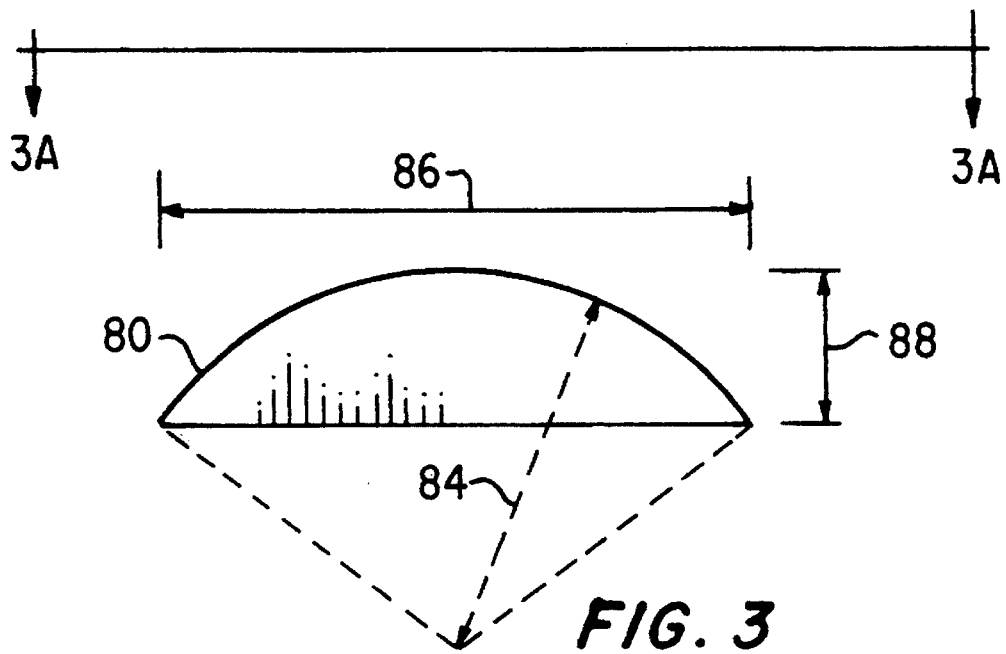
FIG. 3 is a sectional view of a single microlens.
Figure 3A:
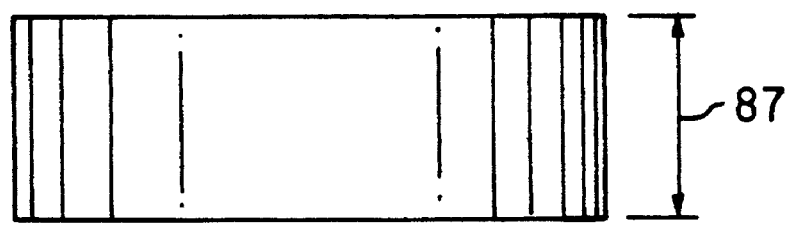
FIG. 3A is a plan view of one embodiment of a single microlens.

A single microlens 80 is shown in FIG. 3. The microlens can be either a spherical lens or an aspherical lens or an astigmatic lens. The footprint of a microlens 80 is not necessarily circular, but can be rectangular in shape, as shown in FIG. 3A, having a length 86 and width 87 that are respectively equal in length with repeat distances 38 and 40.

If microlens 80 is a spherical lens, the lens will have one curved surface having a radius of curvature 84. The radius of curvature can vary widely depending on the repeat distances 38 and 40 of the corresponding microprism array. In order that microlens 80 collect substantially all of the light directed out of waveguide 16 by microprism 28, the f-number of microlens 80 should be relatively small. The f-number values for microlens 80 can range from about 0.5 to about 4.0. More preferred values for the f-number range from about 0.6 to about 3.0.

Another alternate embodiment of the invention is shown in FIGS. 4 and 4A. Two light generating means 14 and 14A are positioned adjacent to two oppositely disposed light accepting surfaces 17 and 17A of the waveguide 16. An array of microprisms 90 are attached to the waveguide 16 in a similar manner disclosed above. The microprisms 90 comprise a light input surface 92 parallel to a light output surface 94 wherein the light output surface 94 is larger in surface area than the light input surface 92. Microprism 90 also comprises two pairs of oppositely disposed tilted sidewalls 96 and 98 and 97 and 99.

Sidewalls 96 and 98 are each formed at the angle φ to the normal of the surface of waveguide 16. Preferably, the tilt angles φ associated with sidewalls 96 and 98 are equal, but equal angles are not necessary. The intersection of each tilted sidewall 96 and 98 with the waveguide 16, or adhesion layer 26 thereon, is parallel to the oppositely disposed light accepting surfaces 17 and 17A, and therefore, perpendicular to the average direction of the light traveling through the waveguide 16.

Referring to FIG. 4A, sidewalls 97 and 99 are each formed at the angle θ to the normal of the surface of waveguide 16. Preferably, the tilt angles θ associated with sidewalls 97 and 99 are equal, but equal angles are not necessary. The intersection of each tilted sidewall 97 and 99 with the waveguide 16 or adhesion layer 26 thereon, is perpendicular to the oppositely disposed light accepting surfaces 17 and 17A, and therefore, parallel to the average direction of the light traveling through the waveguide 16.

The height of microprism 90 has dimension 110 and is similar to height 50 of microprism 28. The length of microprism waveguide 90 has dimensions 120 and 122 where dimension 122 is less than dimension 120. Both lengths 120 and 122 are a function of tilt angle φ and height 110. Lengths 120 and 122 may vary widely depending on the dimensions and resolution of the display. In addition, the lengths 120 and 122 may vary across the surface of the light transmitting means 16 in order to compensate for a lowering of the light intensity inside waveguide 16 as the distance from light generating means 14 and 14A increases. The maximum value for the length 120 is less than the repeat distance 138.

The width of microprism 28 has dimensions 130 and 132 as shown in FIG. 4A. Dimension 132 is less than or equal to dimension 130. Both widths 130 and 132 are a function of tilt angle θ and height 110. Widths 130 and 132 may vary widely depending on the factors discussed above for lengths 120 and 122. The maximum value for the width 130 is less than the repeat distance 140. It is desireable that length dimension 122 be larger than width dimension 132. It is preferred that the ratio of length 122 to width 132 be in the range of 1.2:1 to 5:1. It is more preferred that the ratio be in the range of 1.5:1 to 3:1.

Figure 5:
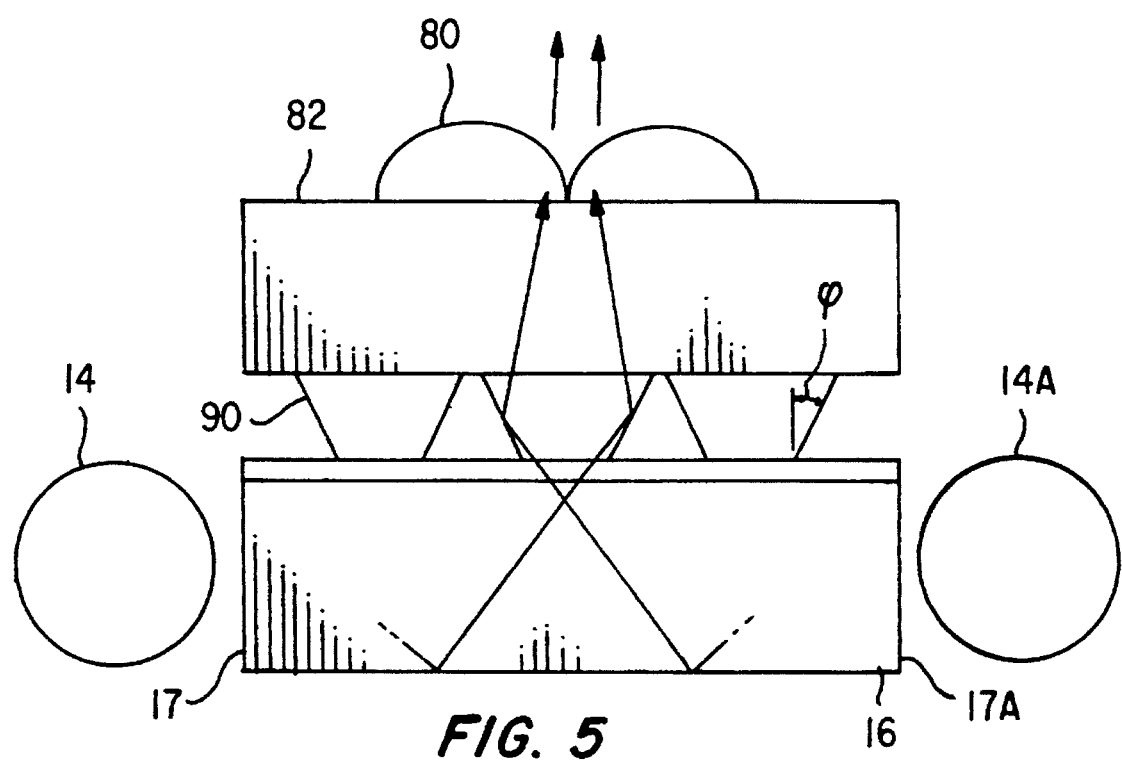
FIG. 5 is an elevation view of the embodiment of FIG. 4 including an array of microlenses.
Figure 6:
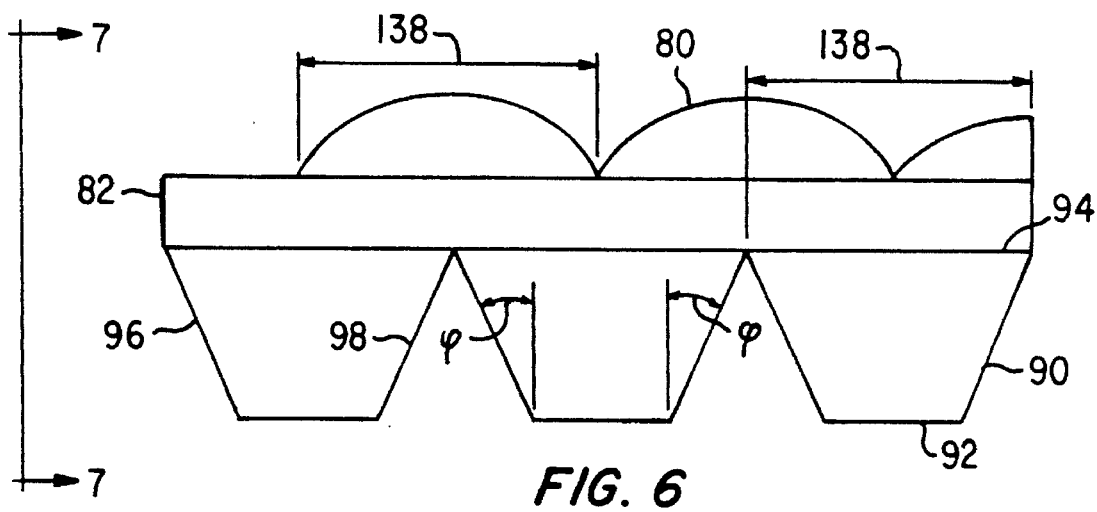
FIG. 6 is an exploded view of the embodiment of FIG. 5.
Figure 7:
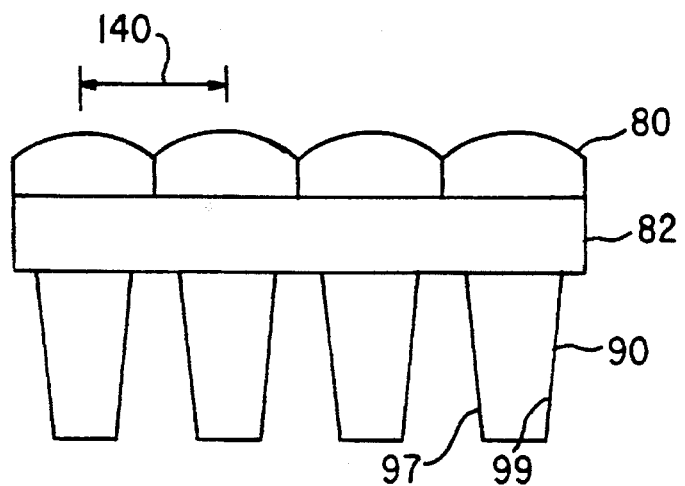
FIG. 7 is an alternate view of the embodiment in FIG. 5.

An still further alternate embodiment of the invention disclosed in FIGS. 5 through 7 comprises an array of microlenses 80 disposed in close proximity to microprisms 90. A spacer 82 separates the microlenses 80 from microprisms 90 as previously disclosed. The light emerges from each microprism 90 as a spatially directed light source and inputs into one or more microlenses. Preferably, the light source is directed to two microlenses. The spatially directed light source emanating from the microprisms 90 is collimated by the microlenses 80 to provide a substantially collimated light pattern. The center-to-center distance between microlenses directly correlates to the repeat distances 138 and 140 of the microprisms 90. The length 86 (FIG. 3A) of each microlens 80 aligns with respect to the microprism array so that equal distances overlap adjacent microprisms as shown in FIGS. 5 and 6. The width 87 of each micro lens aligns with respect to a single microlens as shown in FIG. 7.

Arrays of microprisms 28 and 90 and microlenses 80 can be manufactured by any number of techniques such as molding, including injection and compression molding, casting, including hot roller pressing casting, photopolymerization within a mold and photopolymerization processes which do not employ a mold. A preferred manufacturing technique would be one that allows the reflecting means 18 which comprises an array of microprisms 28 or 90, an array of microlenses 80 and a spacer 82 to be manufactured as a single integrated unit. An advantage of this technique would be the elimination of alignment errors between the array of microprisms and microlenses if the arrays were manufactured separately and then attached in the relationship described above.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An illumination assembly for providing a spatially directed light source comprising:
   (a) a light transmitting means having a first light accepting surface in close proximity to a first diffuse light source, wherein said light transmitting means transports light emanating from said first diffuse light source;
   (b) reflecting means for redirecting said light comprising an array of microprisms wherein each microprism comprises:
      (i) a light input surface attached to said light transmitting means;
      (ii) a light output surface distal from and parallel to said light input surface and having a surface area at least equal to the surface area of said light input surface;
      (iii) a first pair of oppositely disposed sidewalls disposed between and continuous with said light input surface and said light output surface and intersecting said light transmitting means wherein the lines of intersection are substantially parallel to said first light accepting surface and at least one of said sidewalls forms a first tilt angle with respect to the normal of the surface of said light transmitting means;
      (iv) a second pair of oppositely disposed tilted sidewalls, disposed between and continuous with said light input surface and said light output surface and intersecting said light transmitting means wherein said lines of intersection are substantially perpendicular to said first light accepting surface and at least one of said sidewalls forms a second tilt angle with respect to the normal of the surface of said light transmitting means;
   wherein, said light reflecting through said light transmitting means enters said microprisms through said light input surfaces, is redirected by said sidewalls and emerges through said light output surfaces as a spatially directed light source.

2. An illumination assembly comprising:

(a) a light transmitting means for accepting light from a light source and causing light to transmit therethrough;

(b) an array of microprisms wherein each microprism comprises:

(i) a light input surface optically coupled to said light transmitting means for receiving a portion of light transmitting through said light transmitting means;

(ii) a first pair of sidewalls with each having an edge defined by said light input surface and at least one of said sidewalls is positioned for effecting total internal reflection of a portion of light received by said light input surface;

(iii) a second pair of sidewalls with each having an edge defined by said light input surface and at least one of said sidewalls is positioned for effecting total internal reflection of a portion of light received by said light input surface.

3. The illumination assembly of claim 2 wherein said light transmitting means is a waveguide.

4. The illumination assembly of claim 2 to further comprising an array of microlenses, wherein the light output of each microprism is directed to at least one corresponding microlens.

5. The illumination assembly of claim 4 wherein said microprisms and microlenses are constructed from organic polymeric material.

6. The illumination assembly of claim 4 wherein said array of microprisms and array of microlenses are integrally formed.

7. The illumination assembly of claim 4 wherein said microprisms, microlenses, and light transmitting means have an index of refraction of between about 1.45 and about 1.65.

8. An illumination assembly comprising:

(a) a light transmitting means having a first light accepting surface in close proximity to a first light source, wherein said light transmitting means transports light emanating from said first light source;

(b) an array of microprisms wherein each microprism comprises:

(i) a light input surface optically coupled to said light transmitting means for receiving a portion of light transmitting through said light transmitting means;

(ii) a light output surface having a surface area greater than the surface area of said light input surface;

(iii) a first pair of sidewalls disposed between and contiguous with said light input surface and said light output surface and at least one of said sidewalls forms a first tilt angle to the normal of the surface of said light transmitting means;

(iv) a second pair of sidewalls, disposed between and contiguous with said light input surface and said light output surface and at least one of said sidewalls forms a second tilt angle to the normal of the surface of said light transmitting means;

wherein, said light reflecting through said light transmitting means enters said microprisms through said light input surfaces, is redirected by said sidewalls and emerges through said light output surfaces as a spatially directed light source.

9. The illumination assembly of claim 8 wherein said reflecting means further comprises an array of microlenses, wherein the light output of each microprism is directed to at least one corresponding microlens.

10. The illumination assembly of claim 9 wherein said microprisms, microlenses, and light transmitting means have an index of refraction of between about 1.40 and about 1.65.

11. The illumination assembly of claim 9 herein said array of microprisms and array of microlenses are integrally formed.

12. The illumination assembly of claim 8 wherein said first tilt angle is between 15 to 50 degrees to the normal of the surface of said light transmitting means.

13. The illumination assembly of claim 8 wherein second tilt angle is between 0 to 25 degrees to the normal of the surface of said light transmitting means.

14. The illumination assembly of claim 8 wherein said light transmitting means further comprises a second light accepting surface in close proximity to a second light source, wherein said light transmitting means transports light emanating from said second light source.

15. The illumination assembly of claim 14 wherein said first light accepting surface is oppositely disposed from said second light accepting surface.

16. The illumination assembly of claim 8 wherein said output surface is parallel to said input surface.

17. An illumination assembly comprising:

(a) a light transmitting means;

(b) an array of microprisms wherein each microprism comprises:

(i) a light input surface optically coupled to said light transmitting means;

(ii) a first pair of sidewalls with each sidewall having one edge defined by said light input surface and at least one of said sidewalls is positioned for effecting total internal reflection of light;

(iii) a second pair of sidewalls with each sidewall having an edge defined by said light input surface and at least one of said sidewalls is positioned for effecting total internal reflection of light; and (c) an array of microlenses integrally formed with said array of microlenses wherein a portion of light reflecting through said light transmitting means enters each microprisms through said light input surfaces, and is redirected by said sidewalls through said microprisms.

18. The illumination assembly of claim 17 wherein said microprisms and microlenses are formed from organic polymeric material having an index of refraction of between about 1.40 and 1.65.

19. The illumination assembly of claim 17 wherein said first pair of sidewalls forms a tilt angle of between 15 to 50 degrees to the normal of said light transmitting means.

20. The illumination assembly of claim 17 wherein said second pair of sidewalls forms a tilt angle of between 0 to 25 degrees to the normal of said light transmitting means.

* * * * *